T. B. BURTIS.
Grinding Mill.
No. 51,551.  Patented Dec. 19, 1865.
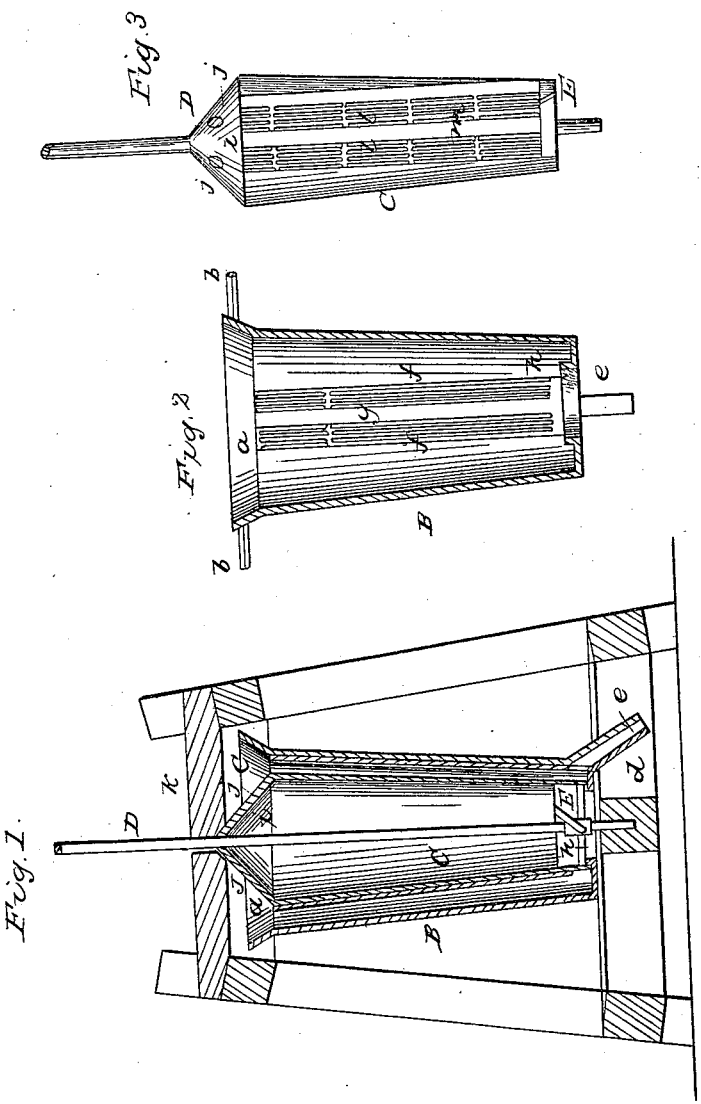

UNITED STATES PATENT OFFICE.

T. B. BURTIS, OF CHICAGO, ILLINOIS.

IMPROVEMENT IN GRINDING-MILLS.

Specification forming part of Letters Patent No. 51,551, dated December 19, 1865.

*To all whom it may concern:*

Be it known that I, T. B. BURTIS, of Chicago, in the county of Cook and State of Illinois, have invented a new and Improved Grinding-Mill; and I do hereby declare that the following is a full, clear, and exact description thereof, which will enable those skilled in the art to make and use the same, reference being had to the accompanying drawings, forming part of this specification, in which—

Figure 1 is a vertical central section of my invention; Fig. 2, a detached vertical central section of the shell of the same; Fig. 3, a detached external view of the grinder pertaining to the same.

Similar letters of reference indicate corresponding parts.

This invention relates to a new and improved mill for grinding corn and other substances, and of that class which are composed of a vertical rotary cone-shaped grinder placed within a shell of corresponding form.

The invention consists in arranging the shell in such a manner that it may adjust itself to the grinder, and insure an equal pressure on the grain or other substance being ground, all around the grinder, and also in providing the grinder, both externally and internally, with fans to cause, during the grinding operation, a current of air to be forced down between the grinder and shell, and also up through the interior of the grinder, whereby the mill is kept cool, expansion of the metal prevented, and the meal or flour also kept comparatively cool.

A represents a framing, which may be constructed in any proper manner to support the working parts, and B is a shell of cast metal, and of inverted conical form, provided with a flaring flange, $a$, at its upper end, and having two pins, $b\ b$, projecting horizontally from it at opposite sides, (see Fig. 2,) said pins being fitted loosely in holes in the upper cross-bars, $c$, of the framing. The lower end of the shell rests lightly on a cross-bar, $d$, at the lower part of the framing, no cleats or fastenings of any kind being applied to it. By this arrangement the shell B is allowed to adjust itself in the framing in a lateral direction. The lower end of the shell is provided with upright corrugations $f$, with spaces $g$ between them, as shown clearly in Fig. 2, and an annular flange, $h$, is secured to the bottom of the shell, concentric therewith.

C represents the grinder, of inverted conical form, corresponding to the shell B, but smaller in diameter. This grinder is hollow, and open at its lower end, which is fitted over the flange $h$, as shown in Fig. 1. The grinder is provided with a conical cap, $i$, perforated, as shown at $j$, Figs. 1 and 3, and said grinder is keyed at the apex of its cap $i$ to a vertical shaft, D, which has its upper bearing in a cross-piece, $k$, of the framing A, and its lower end stepped in the cross-bar $d$, as shown in Fig. 1. The exterior of the grinder C is provided with corrugations $l$, having spaces $m$ between them, and in the lower part of the grinder there are fans or wings E, and also at the exterior of the same at its lower part.

From the above description it will be seen that as the grinder C is rotated a current of air will be forced up through the interior of the grinder, and also down through the space between the grinder and the shell, the spaces $g\ m$ allowing the air to pass down between the corrugations of the shell and grinder. By this means the shell and grinder will be kept in a cool state, as well as the flour or meal being ground, and the shell, in consequence of being arranged as shown, will be allowed to adjust itself to the grinder, so that an equal pressure will be exerted on the grain or substance being ground all around the grinder.

The grain or other substance to be ground is fed into the upper end of the shell B.

Having thus described my invention, I claim as new and desire to secure by Letters Patent—

1. The placing or arranging of the shell B in the framing A, in the manner substantially as shown, to admit of the self-lateral adjustment of said shell relatively with the grinder C, for the purpose specified.

2. The providing of the lower part of the grinder C, both internally and externally, with fans or wings E, substantially as and for the purpose set forth.

T. B. BURTIS.

Witnesses:
N. BERDEL,
WM. PELLOGE.